United States Patent
Kubo (10) Patent No.: US 10,001,632 B2
(45) Date of Patent: Jun. 19, 2018

(54) LASER MICROSCOPE APPARATUS

(71) Applicant: OLYMPUS CORPORATION, Shibuya-ku, Tokyo (JP)

(72) Inventor: Hirokazu Kubo, Tokyo (JP)

(73) Assignee: OLYMPUS CORPORATION, Tokyo (JP)

(*) Notice: Subject to any disclaimer, the term of this patent is extended or adjusted under 35 U.S.C. 154(b) by 52 days.

(21) Appl. No.: 15/008,249

(22) Filed: Jan. 27, 2016

(65) Prior Publication Data
US 2016/0231547 A1  Aug. 11, 2016

(30) Foreign Application Priority Data

Feb. 5, 2015 (JP) .................. 2015-021242

(51) Int. Cl.
G02B 21/00 (2006.01)
H04N 7/18 (2006.01)
G02B 21/36 (2006.01)

(52) U.S. Cl.
CPC ....... *G02B 21/008* (2013.01); *G02B 21/0064* (2013.01); *G02B 21/361* (2013.01)

(58) Field of Classification Search
CPC .............. G02B 21/008; G02B 21/0064; G02B 21/006; G02B 21/361; H04N 7/18
See application file for complete search history.

(56) References Cited

U.S. PATENT DOCUMENTS

| 5,216,658 A | 6/1993 | Clark |
| 5,596,411 A | 1/1997 | Fanton et al. |
| 6,028,306 A | 2/2000 | Hayashi |

(Continued)

FOREIGN PATENT DOCUMENTS

| JP | 08062039 A | 3/1996 |
| JP | 2001012902 A | 1/2001 |

(Continued)

OTHER PUBLICATIONS

"Lecture and Practice, Live-cell fluorescence imaging, Osaka University and Hokkaido University, Microscopy course book", edited by Tokuko Haraguchi, et al., Kyoritsu Shuppan Co., Ltd., pp. 151 and 152.

(Continued)

*Primary Examiner* — Sang Nguyen
(74) *Attorney, Agent, or Firm* — Holtz, Holtz & Volek PC (57) ABSTRACT

A laser microscope apparatus including: a scanning unit that scans laser light on a sample; an objective lens that collects observation light from the sample; a photo-detection unit that has a light-receiving surface formed of an array of a plurality of detecting elements capable of detecting a single photon, that receives the observation light incident on the light-receiving surface, and that outputs intensity signals having intensities corresponding to the amounts of the received observation light; an image generating unit that generates an image on the basis of the intensities of the intensity signals and scanning positions of the laser light; a processor for notifying a user when the intensity signals used to generate the image include intensity signals having intensities equal to or larger than a predetermined threshold that is set according to the beam diameter of the observation light incident on the light-receiving surface.

22 Claims, 7 Drawing Sheets

(56) References Cited

U.S. PATENT DOCUMENTS

| | | | |
|---|---|---|---|
| 7,304,790 B2* | 12/2007 | Kawano | G02B 21/002 250/201.3 |
| 7,952,722 B2 | 5/2011 | Chan et al. | |
| 2002/0043611 A1* | 4/2002 | Yoshikawa | H01L 27/00 250/208.1 |
| 2007/0114362 A1 | 5/2007 | Feng et al. | |
| 2008/0055718 A1* | 3/2008 | Kono | G01N 21/6458 359/381 |
| 2008/0158566 A1 | 7/2008 | Suzuki et al. | |
| 2008/0266551 A1 | 10/2008 | Araki et al. | |
| 2010/0067102 A1* | 3/2010 | Yokoi | G01N 21/6458 359/385 |
| 2011/0043619 A1* | 2/2011 | Wolleschensky | G01N 21/6428 348/79 |
| 2012/0162754 A1 | 6/2012 | Liedtke et al. | |
| 2012/0206590 A1* | 8/2012 | Yamamoto | G02B 7/28 348/79 |
| 2012/0228802 A1 | 9/2012 | Kan et al. | |
| 2012/0320184 A1 | 12/2012 | Seyfried et al. | |
| 2013/0128268 A1* | 5/2013 | Tomioka | G01J 3/0237 356/328 |
| 2015/0008309 A1 | 1/2015 | Wolleschensky et al. | |
| 2015/0362715 A1 | 12/2015 | Kubo | |
| 2016/0169806 A1* | 6/2016 | Dantus | G01J 3/44 356/301 |
| 2016/0169937 A1* | 6/2016 | Labuda | G01Q 20/02 850/6 |
| 2017/0184834 A1 | 6/2017 | Wolleschensky et al. | |

FOREIGN PATENT DOCUMENTS

| | | |
|---|---|---|
| JP | 2008275763 A | 11/2008 |
| JP | 2010091694 A | 4/2010 |
| JP | 2011082298 A | 4/2011 |
| JP | 2012133368 A | 7/2012 |
| JP | 2013003587 A | 1/2013 |
| JP | 2015515018 A | 5/2015 |
| WO | 2010134351 A1 | 11/2010 |

OTHER PUBLICATIONS

Tokuko Haraguchi, et al., "Lectures and Practice. Fluorescence Imaging of Living Cells", Osaka University & Hokkaido University, Microscope Course Book, Kyoritsu Shuppan Co., Ltd., pp. 150 & 151.

Related U.S. Appl. No. 14/722,519; Title: "Laser Microscope Apparatus"; First Named Inventor: Hirokazu Kubo; filed May 27, 2015.

\* cited by examiner

LASER MICROSCOPE APPARATUS

CROSS-REFERENCE TO RELATED APPLICATIONS

This application is based on Japanese Patent Application No. 2015-021242 filed on Feb. 5, 2015, the content of which is incorporated herein by reference.

TECHNICAL FIELD

The present invention relates to a laser microscope apparatus.

BACKGROUND ART

There are conventionally known laser microscope apparatuses that adopt a PMT (photomultiplier tube) as a photodetector (for example, see NPTL 1). In addition to a PMT, an MPPC (Multi-Pixel Photon Counter), a SiPM (Silicon Photomultiplier), and a PPD (pixelated Photon Detector), such as a multi-pixel avalanche photodiode, are known photodetectors.

When a PPD is used in an operation mode in which, upon detecting light, a signal with a certain intensity is output irrespective of the intensity of the light, that is, in Geiger mode, it is possible to detect weak light at the single photon level. When a PPD is used in Geiger mode, the number photons that can be detected per unit time is about one photon per pixel. Since the PPD has multiple pixels, even when the number of photons incident on the PPD is increased, it is possible to detect the corresponding number of photons.

The upper limit (saturation level) of the dynamic range of the PPD depends on the number of pixels on which light is incident, among the total pixels included in the PPD, and the saturation level becomes higher as the number of pixels on which light is incident becomes larger. Specifically, the saturation level of the PPD depends on the beam diameter of light incident on the PPD, and the saturation level of the PPD becomes higher as the beam diameter becomes larger. The beam diameter varies depending on an observation condition, such as the exit NA (numerical aperture) of an objective lens. Therefore, for example, when the user changes the objective lens from one with a large exit NA to one with a small exit NA, the saturation level of the PPD is lowered.

CITATION LIST

Non-Patent Literature

{NPTL 1} "Lecture and Practice, Live-cell fluorescence imaging, Osaka University and Hokkaido University, Microscopy course book" edited by Tokuko HARAGUCHI, Hiroshi KIMURA, and Yasushi HIRAOKA, KYORITSU SHUPPAN CO., LTD., p. 151-152

SUMMARY OF INVENTION

A first aspect of the present invention is a laser microscope apparatus including: a scanning unit that scans laser light on a sample; an objective lens that collects observation light produced in the sample when irradiated with the laser light; a photo-detection unit that has a light-receiving surface formed by arraying a plurality of detecting elements capable of detecting a single photon on a planar surface, that receives the observation light collected by the objective lens and incident on the light-receiving surface, and that outputs intensity signals having intensities corresponding to the amounts of the received observation light; an image generating unit that generates an image of the sample on the basis of the intensities of the intensity signals output from the photo-detection unit and scanning positions of the laser light scanned by the scanning unit; and a processor for notifying, when the intensity signals used to generate the image in the image generating unit include intensity signals having intensities equal to or larger than a predetermined threshold, a user of the existence of the intensity signals having intensities equal to or larger than the predetermined threshold, in which the predetermined threshold is set according to a beam diameter of the observation light incident on the light-receiving surface.

A second aspect of the present invention is laser microscope apparatus comprising: a scanner that scans laser light on a sample; an objective lens that collects observation light produced in the sample when irradiated with the laser light; a photodetector that has a light-receiving surface formed by arraying a plurality of detecting elements capable of detecting a single photon on a planar surface, that receives the observation light collected by the objective lens and incident on the light-receiving surface, and that outputs intensity signals having intensities corresponding to the amounts of the received observation light; a controller that controls the scanner and that processes the intensity signals output from the photodetector; and an alarm that outputs an alarm in response to an abnormal-state signal, wherein the controller is configured to perform: generating an image of the sample on the basis of the intensities of the intensity signals output from the photodetector and scanning positions of the laser light scanned by the scanner; setting a predetermined threshold for the intensities of the intensity signals used to generate the image according to a beam diameter of the observation light incident on the light-receiving surface; comparing the intensity of each picture element of the image with the threshold; and outputting the abnormal-state signal to the alarm only in a case in which a number of the picture elements that have intensities equal to or larger than the predetermined threshold is equal to more than a predetermined number.

A third aspect of the present invention is a laser microscope apparatus comprising: a scanner that scans laser light on a sample; an objective lens that collects observation light produced in the sample when irradiated with the laser light; a photodetector that has a light-receiving surface formed by arraying a plurality of detecting elements capable of detecting a single photon on a planar surface, that receives the observation light collected by the objective lens and incident on the light-receiving surface, and that outputs intensity signals having intensities corresponding to the amounts of the received observation light; and a controller that controls the scanner and that processes the intensity signals output from the photodetector, wherein the controller is configured to perform: generating an image of the sample on the basis of the intensities of the intensity signals output from the photodetector and scanning positions of the laser light scanned by the scanner; setting a predetermined threshold for the intensities of the intensity signals used to generate the image according to a beam diameter of the observation light incident on the light-receiving surface; comparing the intensity of each picture element of the image with the threshold; and highlighting the picture elements at which the intensities of the intensity signals are equal to or larger than the predetermined threshold in the image.

A fourth aspect of the present invention is a laser microscope apparatus comprising: a scanner that scans laser light on a sample; an objective lens that collects observation light produced in the sample when irradiated with the laser light; a photodetector that has a light-receiving surface formed by arraying a plurality of detecting elements capable of detecting a single photon on a planar surface, that receives the observation light collected by the objective lens and incident on the light-receiving surface, and that outputs intensity signals having intensities corresponding to the amounts of the received observation light; and a controller that controls the scanner and that processes the intensity signals output from the photodetector, wherein the controller is configured to perform: generating an image of the sample on the basis of the intensities of the intensity signals output from the photodetector and scanning positions of the laser light scanned by the scanner; and setting a predetermined threshold for the intensities of the intensity signals used to generate the image according to a beam diameter of the observation light incident on the light-receiving surface, wherein the generating includes converting the intensities of the intensity signals to the gradation values of picture elements of the image such that the intensities of the intensity signal substantially equal to the predetermined threshold correspond to a maximum value of gradation values.

A fifth aspect of the present invention is a laser microscope apparatus comprising: a scanner that scans laser light on a sample; an objective lens that collects observation light produced in the sample when irradiated with the laser light; a photodetector that has a light-receiving surface formed by arraying a plurality of detecting elements capable of detecting a single photon on a planar surface, that receives the observation light collected by the objective lens and incident on the light-receiving surface, and that outputs intensity signals having intensities corresponding to the amounts of the received observation light; and a controller that controls the scanner and that processes the intensity signals output from the photodetector, wherein the controller is configured to perform: generating an image of the sample on the basis of the intensities of the intensity signals output from the photodetector and scanning positions of the laser light scanned by the scanner; and setting a predetermined threshold for the intensities of the intensity signals used to generate the image according to a beam diameter of the observation light incident on the light-receiving surface, wherein the generating includes adjusting a gain for the intensity signals output from the photodetector such that the intensities of the intensity signals correspond to a maximum value of gradation values of the image becomes substantially equal to the predetermined threshold.

DESCRIPTION OF EMBODIMENTS

First Embodiment

A laser microscope apparatus 1 according to a first embodiment of the present invention will be described below with reference to the drawings.

Figure 1:
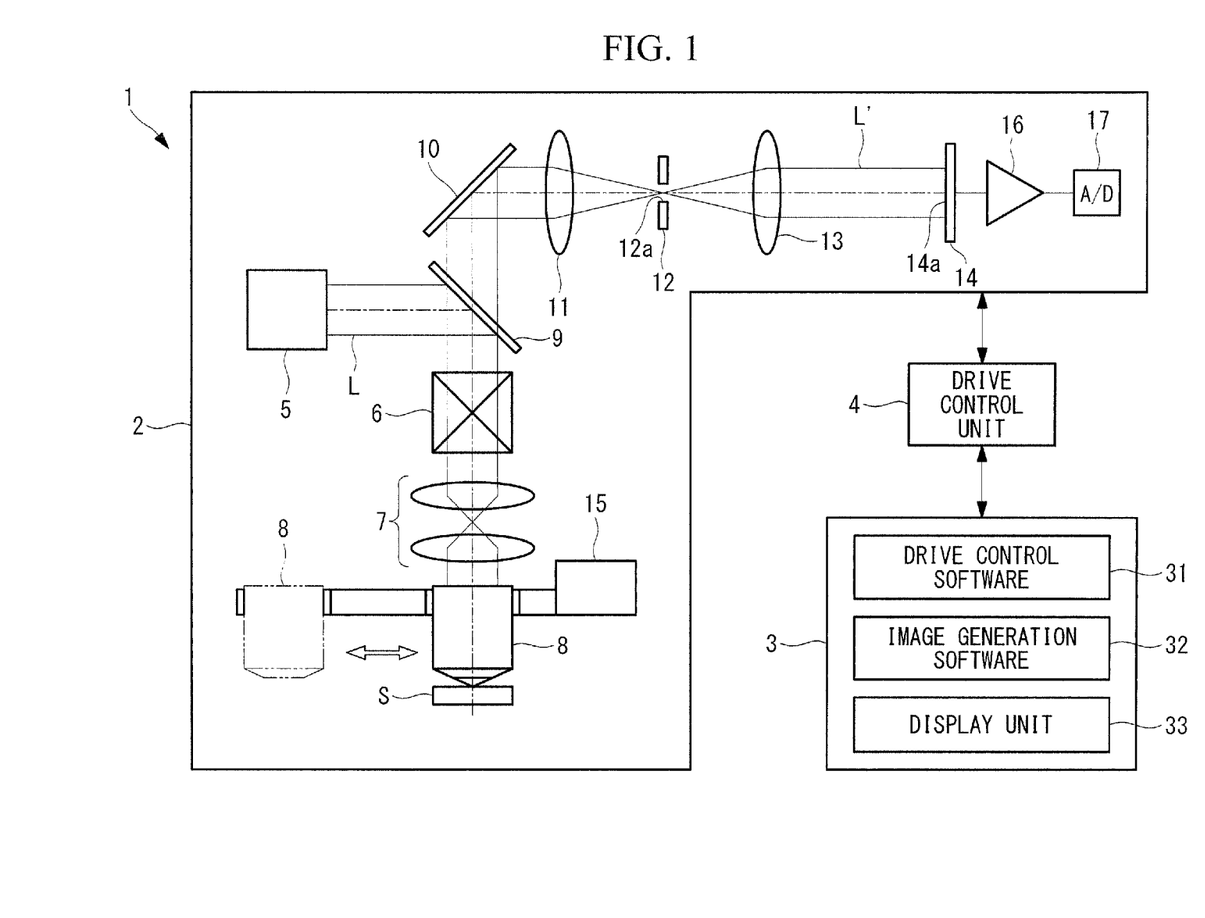
FIG. 1 is a view showing, in outline, the configuration of a laser microscope apparatus according to a first embodiment of the present invention.

As shown in FIG. 1, the laser microscope apparatus 1 of this embodiment is provided with a microscope body 2, a computer 3 with which a user operates the microscope body 2, and a drive control unit 4 that is connected between the microscope body 2 and the computer 3 and that performs drive control for the microscope body 2 in response to an input to the computer 3.

The microscope body 2 is provided with a laser light source 5 that outputs laser light L, an XY galvanometer mirror (scanning unit, scanner) 6 that two-dimensionally scans the laser light L output from the laser light source 5, a relay optical system 7 that relays the laser light L scanned by the XY galvanometer mirror 6, and an objective lens 8 that radiates the laser light L relayed by the relay optical system 7 onto a specimen S and that collects observation light L' (for example, fluorescence) produced from the specimen S.

Furthermore, the microscope body 2 is provided with a dichroic mirror 9 that separates the observation light L', which is collected by the objective lens 8 and returns the light path of the laser light L, a reflecting mirror 10 that reflects the observation light L' separated by the dichroic mirror 9, a condenser lens 11 that condenses the observation light L reflected by the reflecting mirror 10, a confocal aperture (pinhole member) 12 that limits passing of the observation light L' condensed by the condenser lens 11, a collimating lens 13 that converts the observation light L' that has passed through the confocal aperture 12 into substantially collimated light flux, and a PPD (pixelated Photon Detector, photo-detection unit) 14 that detects the observation light L that has been converted into the substantially collimated light flux by the collimating lens 13.

A plurality of types of objective lenses 8 that have different NAs and magnifications are supported by a revolver 15. The revolver 15 is controlled by the drive control unit 4 or is manually manipulated by the user, thereby inserting one of the objective lenses 8 in the light path of the laser light L.

The dichroic mirror 9 reflects the laser light L output from the laser light source 5 toward the XY galvanometer mirror 6 and transmits the observation light L', which returns the light path of the laser light L from the specimen S via the objective lens 8, the XY galvanometer mirror 6, etc., therethrough toward the reflecting mirror 10.

The confocal aperture 12 has a pinhole 12*a* that is disposed at a position optically conjugate with the focal point of the objective lens 8, to allow only observation light L coming from the focal position of the objective lens 8 to pass through the pinhole 12*a*.

The PPD 14 is a photodetector, for example, an MPPC (Multi-Pixel Photon Counter), a SiPM (Silicon Photomultiplier), or a multi-pixel avalanche photodiode. The PPD 14 has a light-receiving surface 14*a* on which a plurality of pixels (detecting elements, not shown) that detect the observation light L' are two-dimensionally arrayed. Each pixel is a unit for detecting photons.

The PPD 14 is set so as to be driven in Geiger mode, in which each pixel outputs a pulse with a certain intensity irrespective of the intensity of incident light. In Geiger mode, the number of photons detected by each pixel of the PPD 14 per unit time is about one. Pixels that have detected the observation light L' output pulses, and the PPD 14 outputs, as an intensity signal, the sum of the pulses output from the respective pixels.

An amplifier (amplifying unit) 16 that amplifies an intensity signal output from the PPD 14 and an analog-digital (AD) converter (amplifying unit) 17 that converts the intensity of the intensity signal amplified by the amplifier 16 into a digital value (intensity signal value) are connected at subsequent stages of the PPD 14. The AD converter 17 may have an amplification function for amplifying the intensity signal prior to digital conversion.

The computer 3 has installed therein application software (drive control software) 31 for setting operating conditions for the microscope body 2 and application software (image generation software) 32 for generating an image of the specimen S from intensity signal values received from the microscope body 2 and for displaying the generated image. In addition, the computer 3 includes a processor. When the drive control software 31 is executed by the computer 3, the microscope body 2 is operated under drive control of the drive control unit 4. When the image generation software 32 is executed by the computer 3, an image is generated and displayed.

The drive control software (threshold setting unit) 31 can set observation conditions for observing the specimen S with the microscope body 2 when the user inputs the observation conditions by means of arbitrary input devices (not shown), such as a mouse and a keyboard, connected to the computer 3. The observation conditions include at least the type of the objective lens 8 to be used to observe the specimen S, the scanning speed of the laser light L scanned by the XY galvanometer mirror 6, and a gain (amplification factor) used in the amplifier 16. Furthermore, a gain (amplification factor) used in the AD converter 17 may be included in the observation conditions. The observation conditions input in the drive control software 31 are sent from the computer 3 to the drive control unit 4. Upon receiving the observation conditions from the computer 3, the drive control unit 4 performs drive control for the microscope body 2 according to the observation conditions.

Furthermore, the drive control software (condition setting unit) 31 sets an upper limit (predetermined threshold) for the intensity signal value of the observation light L on the basis of the set observation conditions. To set the upper limit, a table stored in a storage device installed in the computer 3 is used. In the table, an upper-limit reference value is associated with each set of observation conditions that includes a combination of the exit NA of the objective lens 8, the aperture size of the pinhole 12*a* of the confocal aperture 12, and the scanning speed of the laser light L scanned by the XY galvanometer mirror 6. The drive control software 31 reads the table from the storage device and selects, from the table, the upper-limit reference value associated with the currently-set observation conditions. Next, the drive control software 31 multiplies the selected upper-limit reference value by the gains used in the amplifier 16 and the AD converter 17, thereby correcting the upper-limit reference value, and sets the obtained corrected value to the upper limit.

Here, a description will be given of the relationship among the upper limit, the observation conditions for observing the specimen S with the microscope body 2, and the saturation level of the PPD 14 with respect to the observation light L'.

Figure 3:
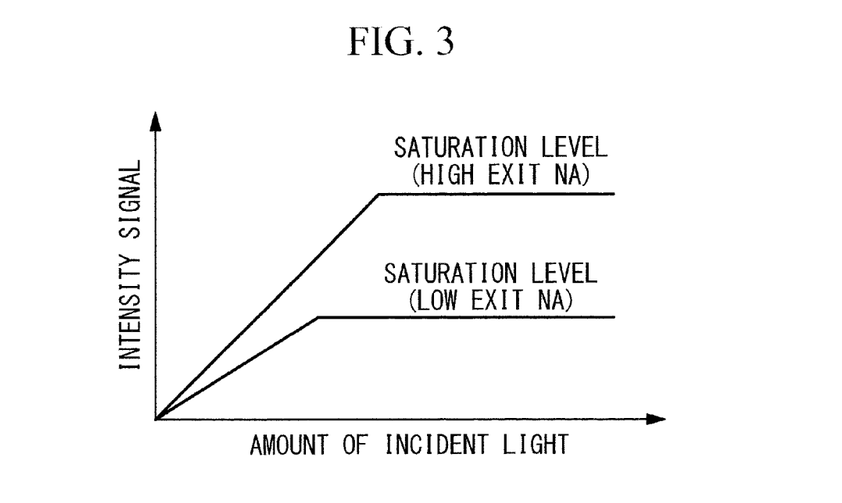
FIG. 3 is a graph showing the relationship between the amount of light incident on the PPD and an intensity signal output from the PPD.

The saturation level is the maximum value of the intensity of the observation light L' that can be detected by the PPD 14. When the amount of observation light L' incident on the light-receiving surface 14*a* falls within the range from zero to the saturation level, as shown in FIG. 3, an intensity signal output from the PPD 14 is proportional to the amount of incident light. However, when the amount of observation light incident on the light-receiving surface 14*a* becomes the saturation level or more, the intensity signal output from the PPD 14 is saturated, thus becoming constant irrespective of the amount of incident light.

The following equation (1) expresses the number of pixels $N_{fired}$ that are excited by incident light in the PPD 14 and that output photon detection signals. In equation (1), $N_{total}$ is the total number of pixels in a region on which the observation light L' is incident, among all pixels in the PPD 14, $N_{photon}$ is the number of incident photons, $P_w$ is the incident time (second) of the observation light L incident on the light-receiving surface 14*a*, the incident time being determined depending on the scanning speed of the laser light L, and $t_d$ is dead time (second) of the pixels, where $P_w$ is larger than $t_d$. $N_{fired}$ can be considered to express an effective dynamic range corresponding to the saturation level of the PPD 14. As is clear from equation (1), $N_{fired}$, that is, the effective dynamic range of the PPD 14, depends on $N_{total}$, that is, the beam diameter of the observation light L' incident on the light-receiving surface 14*a*.

{Equation 1}

$$N_{fired} = N_{total} \times \left(\frac{P_w}{t_d}\right) \times \left[1 - \exp\left(\frac{-(N_{photon} \times PDE)}{N_{total} \times \left(\frac{P_w}{t_d}\right)}\right)\right] \quad (1)$$

Figure 2:
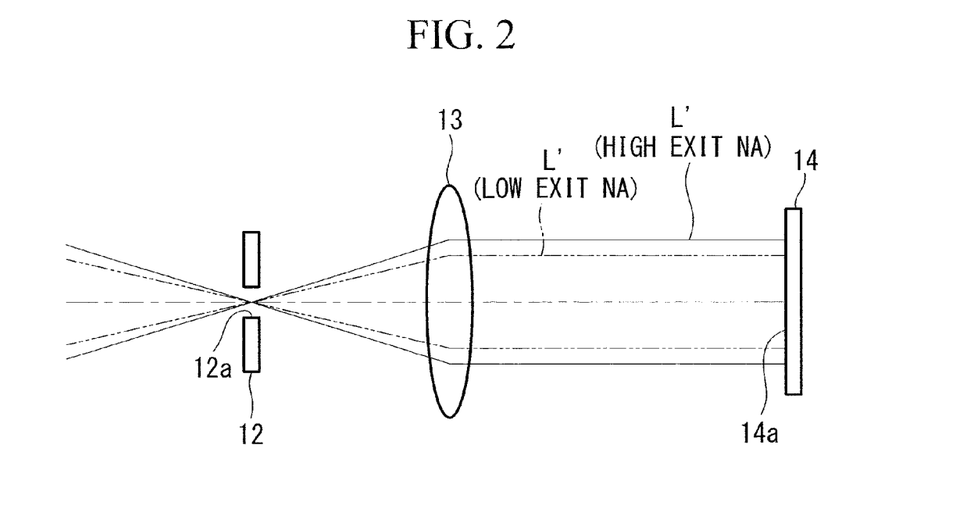
FIG. 2 is a partially-enlarged view of the laser microscope apparatus shown in FIG. 1, for explaining the relationship between an exit NA of an objective lens and the beam diameter of observation light incident on a PPD.

As shown in FIG. 2, when an objective lens 8 with a large exit NA is used, the beam diameter of the observation light L' incident on the light-receiving surface 14*a* becomes large, thus increasing $N_{total}$ and increasing the saturation level of the PPD 14. On the other hand, when an objective lens 8 with a small exit NA is used, the beam diameter of the observation light L incident on the light-receiving surface 14a becomes small, thus reducing $N_{total}$ and reducing the saturation level of the PPD 14.

The beam diameter of the observation light L' incident on the light-receiving surface 14a is additionally influenced by the aperture size of the pinhole 12a of the confocal aperture 12. Therefore, the saturation level of the PPD 14 additionally depends on the aperture size of the pinhole 12a of the confocal aperture 12 in addition to the exit NA of the objective lens 8. Furthermore, the saturation level of the PPD 14 depends on the scanning speed of the laser light L scanned by the XY galvanometer mirror 6. In this way, the saturation level of the PPD 14 varies for each observation condition.

Here, the upper-limit reference value associated with each set of observation conditions in the table corresponds to the intensity of an intensity signal output from the PPD 14 when observation light L' at the saturation level is incident on the light-receiving surface 14a under the observation conditions. The upper limit calculated by correcting the upper-limit reference value with the gains corresponds to an intensity signal value output from the AD converter 17 when observation light L at the saturation level is incident on the light-receiving surface 14a under the observation conditions. Therefore, if the intensity signal value is equal to or larger than the upper limit, this means that the intensity of the observation light L' exceeds the saturation level of the PPD 14.

The image generation software 32 associates intensity signal values with scanning position information of the laser light L scanned by the XY galvanometer mirror 6, thereby generating a two-dimensional image of the specimen S with the intensity signal values serving as gradation values of picture elements. The intensity signal values and the scanning position information of the laser light L scanned by the XY galvanometer mirror 6, which are required for image generation, are obtained from the drive control unit 4 by the computer 3. The image generation software 32 displays the generated image on a display unit 33 of the computer 3.

Furthermore, the image generation software 32 obtains the upper limit, which is set by the drive control software 31, from the drive control software 31. The image generation software 32 compares the gradation values of all picture elements in a single frame image (i.e., the intensity signal values) with the upper limit. When the number of picture elements that have gradation values equal to or larger than the upper limit (hereinafter, referred to as "saturated picture elements") is equal to or more than a predetermined number N, the image generation software 32 causes the computer 3 to send an abnormal-state signal to the drive control unit 4. On the other hand, when the number of saturated picture elements is less than the predetermined number N, the image generation software 32 does not cause the computer 3 to send an abnormal-state signal to the drive control unit 4. Upon receiving the abnormal-state signal, the drive control unit 4 sends the abnormal-state signal to a notification unit.

The predetermined number N is automatically calculated and set by the image generation software 32 or the drive control software 31 on the basis of the total number of picture elements in an image. For example, the predetermined number N is a value obtained by multiplying the total number of picture elements by a predetermined rate. Alternatively, the user can set, in the drive control software 31, a desired value as the predetermined number N.

The notification unit is the computer 3, for example. When receiving the abnormal-state signal from the drive control unit 4, the computer 3 displays, on the display unit 33, a warning indication indicating that the PPD 14 is saturated. Note that the notification unit may be of any type as long as it can notify the user that the PPD 14 is saturated, in a visual or auditory manner. For example, the notification unit may be an alarm, such as a hazard lamp (not shown) for turning on a warning light when receiving the abnormal-state signal or a speaker (not shown) for outputting a warning sound when receiving the abnormal-state signal.

The operation of the thus-configured laser microscope apparatus 1 will now be described.

Figure 4:
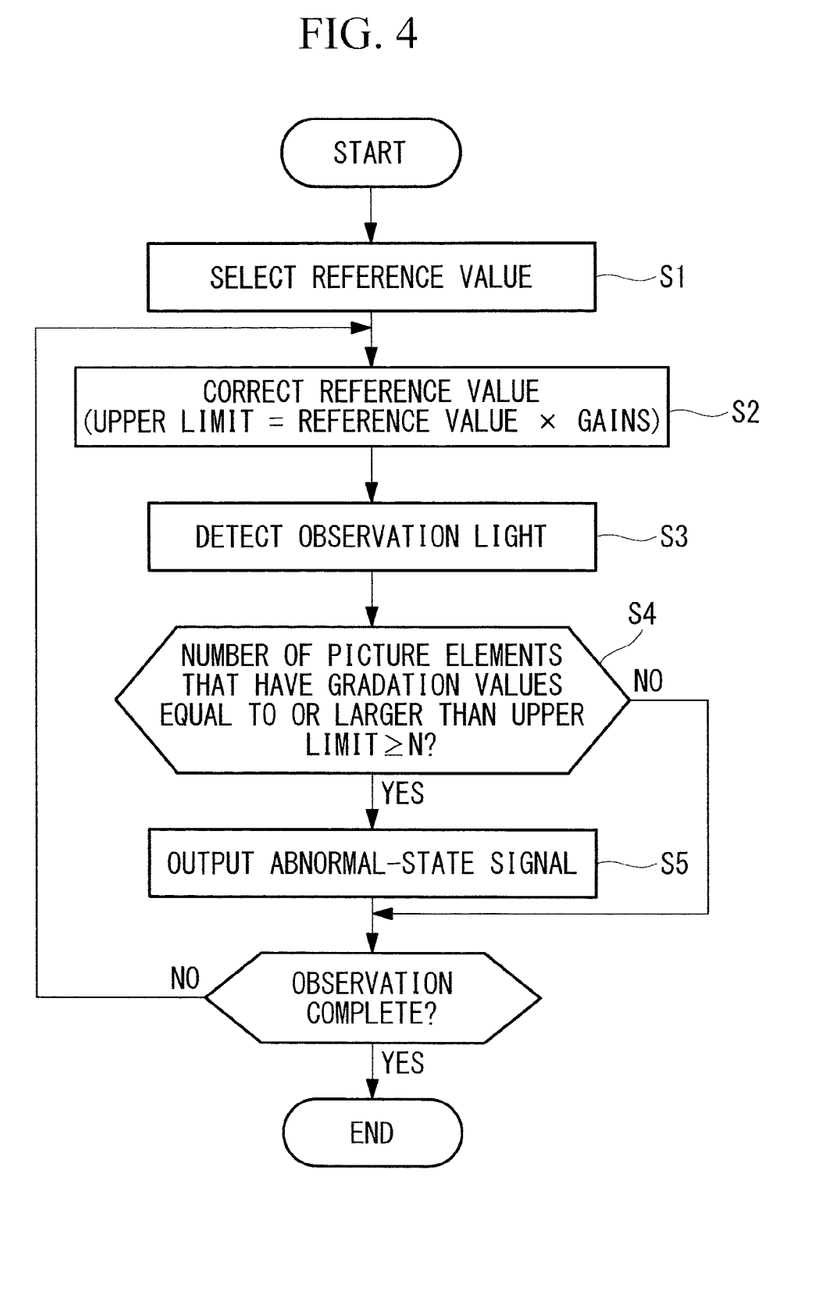
FIG. 4 is a flowchart for explaining processing for determining a saturated state of the PPD, performed by the laser microscope apparatus shown in FIG. 1.

In order to acquire an image of the specimen S by using the laser microscope apparatus 1 of this embodiment, first, the user sets desired observation conditions in the drive control software 31. When the observation conditions are set, the drive control software 31 reads the table from the storage device, as shown in FIG. 4, selects the upper-limit reference value associated with the observation conditions from the table (Step S1), and determines the upper limit by multiplying the selected upper-limit reference value by amplification values (Step S2). Next, the observation conditions input in the drive control software 31 are sent from the computer 3 to the drive control unit 4, and the drive control unit 4 starts to drive the microscope body 2 (Step S3).

The laser light L output from the laser light source 5 is reflected by the dichroic mirror 9, is scanned by the XY galvanometer mirror 6, is relayed by the relay optical system 7, and is radiated by the objective lens 8 onto the specimen S. Accordingly, the laser light L is two-dimensionally scanned on the specimen S in response to an oscillating motion of the XY galvanometer mirror 6.

The observation light L', which is produced from the specimen S when irradiated with the laser light L, is collected by the objective lens 8, is transmitted through the dichroic mirror 9 via the relay optical system 7 and the XY galvanometer mirror 6, is reflected by the reflecting mirror 10, and is condensed by the condenser lens 11. Of the observation light L condensed by the condenser lens 11, only light coming from the focal position of the objective lens 8 in the specimen S passes through the pinhole 12a of the confocal aperture 12, is converted into substantially collimated light flux by the collimating lens 13, and is incident on the PPD 14.

In the PPD 14, among all the pixels, only pixels on which the observation light L' is incident output pulses with a certain intensity, and the intensity signal, which is the sum of the pulses, is output from the PPD 14. The intensity signal is subjected to amplification performed by the amplifier 16 and the AD converter 17 and digital conversion performed by the AD converter 17 and is then sent to the computer 3. Accordingly, the image generation software 32 in the computer 3 associates respective intensity signal values with scanning position information of the laser light L scanned by the XY galvanometer mirror 6, thus generating a two-dimensional image of the specimen S.

Here, the image generation software 32 determines the number of saturated picture elements existing in the image (Step S4). Then, if the number of existing saturated picture elements is equal to or more than the predetermined number N (YES in Step S4), an abnormal-state signal is sent from the computer 3 to the drive control unit 4, and a warning indication is displayed on the display unit 33 (Step S5). With the appearance of the warning indication on the display unit 33, the user can recognize that the observation light L' is too strong relative to the saturation level of the PPD 14, and thus the intensity of the observation light L' is saturated at some picture elements. The warning indication, once it is displayed on the display unit 33, can be made to disappear, for example, when the user weakens the laser light L or increases the scanning speed of the laser light L, to reduce the amount of observation light L incident on the PPD 14 to an amount lower than the saturation level.

In this way, according to this embodiment, the upper limit is set for each set of observation conditions so as to correspond to the saturation level of the PPD 14 under the observation conditions. For example, when the objective lens 8 to be used is changed to one with a different exit NA, thus changing the saturation level of the PPD 14, the upper limit is also changed so as to correspond to the changed saturation level. Therefore, there is the advantage that, even when the saturation level of the PPD 14 is changed by changing the observation conditions, the user can easily determine the saturation level of the PPD 14 under the current observation conditions on the basis of whether a warning indication is displayed or not displayed.

Second Embodiment

Next, a laser microscope apparatus according to a second embodiment of the present invention will be described.

The laser microscope apparatus of this embodiment differs from the laser microscope apparatus of the first embodiment in that the existence of saturated picture elements is recognized by the user by highlighting the saturated picture elements in the image, instead of or in addition to outputting warning information, such as a warning indication, a warning light, or a warning sound, from the notification unit.

In this embodiment, the image generation software 32 highlights, in an image, saturated picture elements against picture elements other than the saturated picture elements. For example, in a case in which the image is monochrome, the saturated picture elements are displayed in a noticeable color, such as red.

The other configurations in this embodiment are the same as those in the first embodiment.

According to this embodiment, there is the advantage that the user, who observes the image, can easily visually recognize saturated picture elements by highlighting the saturated picture elements. In particular, there is the advantage that it is possible to easily view picture elements at which the intensity signals are saturated.

Third Embodiment

Next, a laser microscope apparatus according to a third embodiment of the present invention will be described.

The laser microscope apparatus of this embodiment differs from the laser microscope apparatus of the first embodiment in that the existence of saturated picture elements is recognized by the user by converting the image gradation according to the upper limit such that the saturated picture elements are displayed in white in the image, instead of outputting warning information, such as a warning indication, a warning light, or a warning sound, from the notification unit.

Figure 5:
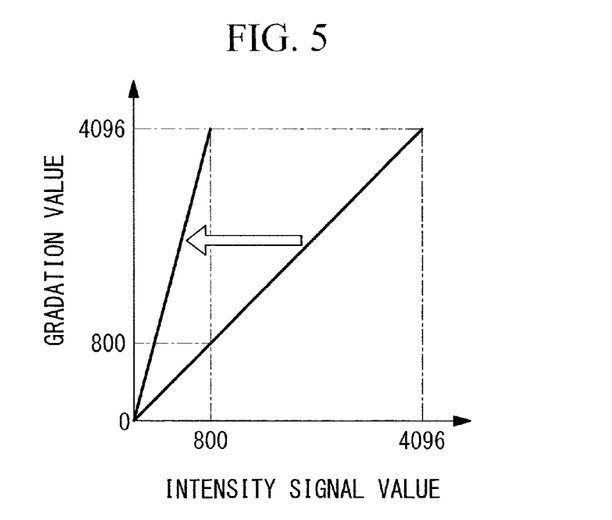
FIG. 5 is a view showing an LUT held by image generation software in a laser microscope apparatus according to a third embodiment of the present invention.

In this embodiment, the image generation software 32 converts the image gradation such that the upper limit set by the drive control software 31 becomes equal to the maximum value in the range of gradation values that each picture element can have. For example, as shown in FIG. 5, in a case where the image has 12 bits (4096 gradations), a look-up table (LUT) for the image, which expresses the correspondence relationship between the intensity signal value and the gradation value at a picture element such that a gradation value of 0 corresponds to black and a gradation value of 4096 corresponds to white, is initially set. Then, when the upper limit is set to 800 by the drive control software 31, the image generation software 32 modifies the LUT such that the gradation value of 800 corresponds to white, thereby converting the image gradation.

The other configurations in this embodiment are the same as those in the first embodiment.

According to this embodiment, there is the advantage that, when there exist saturated picture elements, the saturated picture elements are displayed in white in the image; thus, the user, who observes the image, can easily visually recognize the saturated picture elements, without highlighting the saturated picture elements, as described in the second embodiment. In particular, there is the advantage that it is possible to easily view picture elements at which the intensity signals are saturated.

Fourth Embodiment

Next, a laser microscope apparatus according to a fourth embodiment of the present invention will be described.

The laser microscope apparatus of this embodiment differs from the laser microscope apparatus of the first embodiment in that the existence of saturated picture elements is recognized by the user by changing the gain for the intensity signal, used in at least one of the amplifier 16 and the AD converter 17, according to the upper limit such that the saturated picture elements are displayed in white in the image, instead of outputting warning information, such as a warning indication, a warning light, or a warning sound, from the notification unit.

In this embodiment, when the upper limit is lower than the maximum value (for example, 4096 if the image has 12 bits) in the range of gradation values that each picture element in the image can have, the computer 3 causes the drive control unit 4 to increase the gain used in at least one of the amplifier 16 and the AD converter 17 such that the upper limit becomes equal to the maximum gradation value.

The other configurations in this embodiment are the same as those in the first embodiment.

According to this embodiment, when there exist saturated picture elements, the saturated picture elements are displayed in white in the image, as in the third embodiment; thus, there is the advantage that the user, who observes the image, can easily visually recognize the saturated picture elements, without highlighting the saturated picture elements, as described in the second embodiment. In particular, there is the advantage that it is possible to easily view picture elements at which the intensity signals are saturated.

The above-described first to fourth embodiments can be modified as follows.

First Modification

Figure 6:
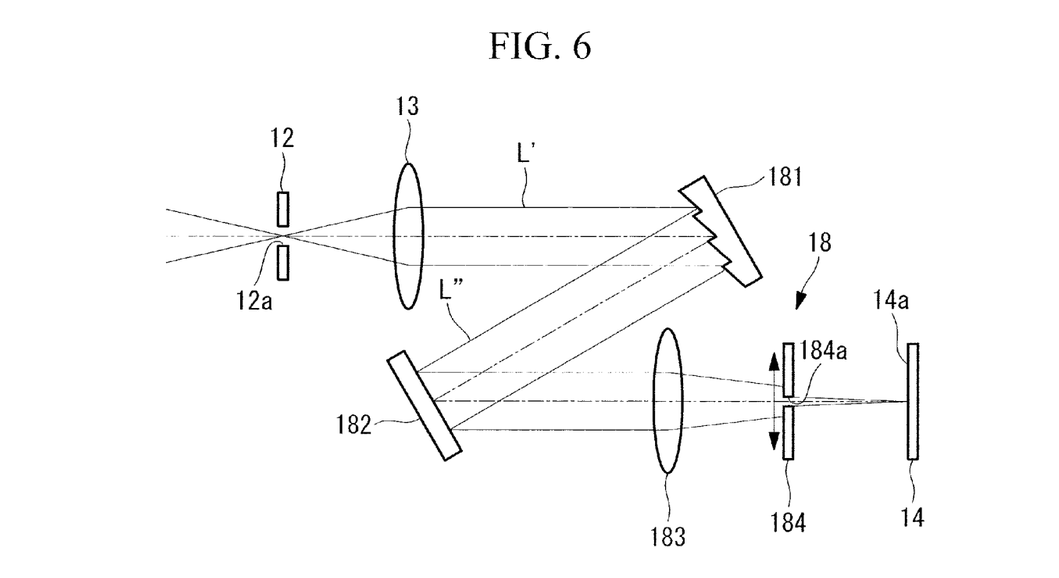
FIG. 6 is a view showing a partial configuration of a first modification of the laser microscope apparatus shown in FIG. 1.

In a first modification of the above-described embodiments, as shown in FIG. 6, there may be further provide, between the collimating lens 13 and the PPD 14, a light dispersing portion 18 that disperses light collected by the objective lens 8 and that emits only light having a predetermined band of wavelengths toward the PPD 14.

As shown in FIG. 6, the light dispersing portion 18 is provided with a diffraction grating 181 that disperses light emitted from the collimating lens 13, thus converting the light into spectral sequences L" whose wavelengths change in one direction, a mirror 182 that reflects the spectral sequences L" generated by the diffraction grating 181, an imaging lens 183 that focuses the spectral sequences L"

reflected by the mirror 182 on the light-receiving surface 14a of the PPD 14, and a slit member 184 that has a slit 184a formed therein for allowing only light of some wavelengths, among the spectral sequences L" focused by the imaging lens 183, to pass therethrough.

The slit member 184 is formed of a light-blocking material and is provided so as to be capable of moving in the direction in which the wavelengths of the spectral sequences L" change. The slit member 184 is moved to change the position of the slit 184a with respect to the spectral sequences L", thereby making it possible to select light to be allowed to pass therethrough toward the PPD 14, among light constituting the spectral sequences L".

Figure 7:
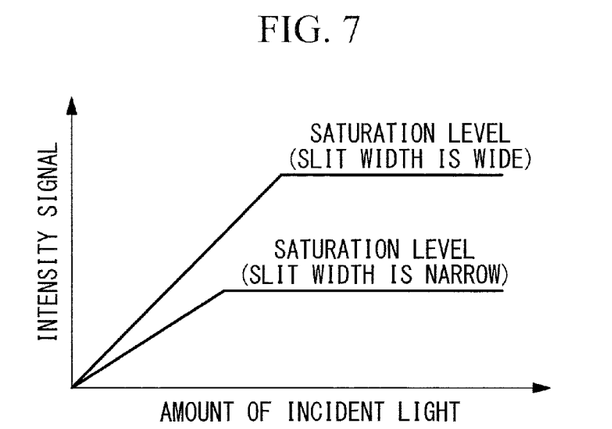
FIG. 7 is a graph showing the relationship between the amount of light incident on the PPD and an intensity signal output from the PPD, in a laser microscope shown in FIG. 6.

In the configuration with the slit member 184, the beam diameter of the observation light L' incident on the PPD 14 additionally depends on the width dimension (slit width) of the slit 184a. Specifically, as shown in FIG. 7, as the slit width becomes large, the beam diameter of light incident on the light-receiving surface 14a of the PPD 14 is increased, and the saturation level of the PAD 14 is increased. Therefore, in this modification, the drive control software 31 sets the upper limit depending, in addition, on the width dimension of the slit 184a.

Second Modification

In a second modification of the above-described embodiments, instead of setting the upper limit on the basis of the table, the drive control software 31 may calculate the upper limit on the basis of the observation, conditions.

For example, a function for the equation (1) is stored in the drive control software 31, and the drive control software 31 calculates the upper limit from equation (1) on the basis of the observation conditions for the microscope body 2. In this case, the beam diameter of the observation light L' incident on the PPD 14 under each set of observation conditions and $N_{total}$ are stored in association with each other, and $N_{total}$ that is associated with the current observation conditions is used for the calculation. The observation conditions may be automatically obtained by the drive control software 31 or may be manually input by the user.

Furthermore, instead of automatic calculation performed by the drive control software 31, the user may calculate the upper limit by using a ready reckoner etc. in which observation conditions and upper limits are associated.

Third Modification

In a third modification of the above-described embodiments, there may be further provide an incident-light-amount reducing unit that reduces the amount of observation light L incident on the PPD 14 when the number of saturated picture elements is equal to or more than the predetermined number N. The incident-light-amount reducing unit may have any configuration as long as the amount of observation light L' incident on the PPD 14 can be reduced without changing the beam diameter of the observation light L'.

In this modification, an incident-light-amount reduction permitting unit (not shown) is further provided, which permits the operation of the incident-light-amount reducing unit when the number of saturated picture elements is equal to or more than the predetermined number N. The incident-light-amount reduction permitting unit is, for example, a GUI (graphical user interface) provided in the computer 3.

A first-example incident-light-amount reducing unit is provided with an acousto-optical element (not shown) that is disposed in the light path of the laser light L and that modulates the intensity of the laser light L, and the acousto-optical element reduces the intensity of the laser light thereby reducing the intensity of the observation light L', which is produced in the specimen S.

Instead of using the acousto-optical element, the electric power supplied to the laser light source 5 may be reduced to reduce the intensity of the laser light L output from the laser light source 5.

Figure 8:
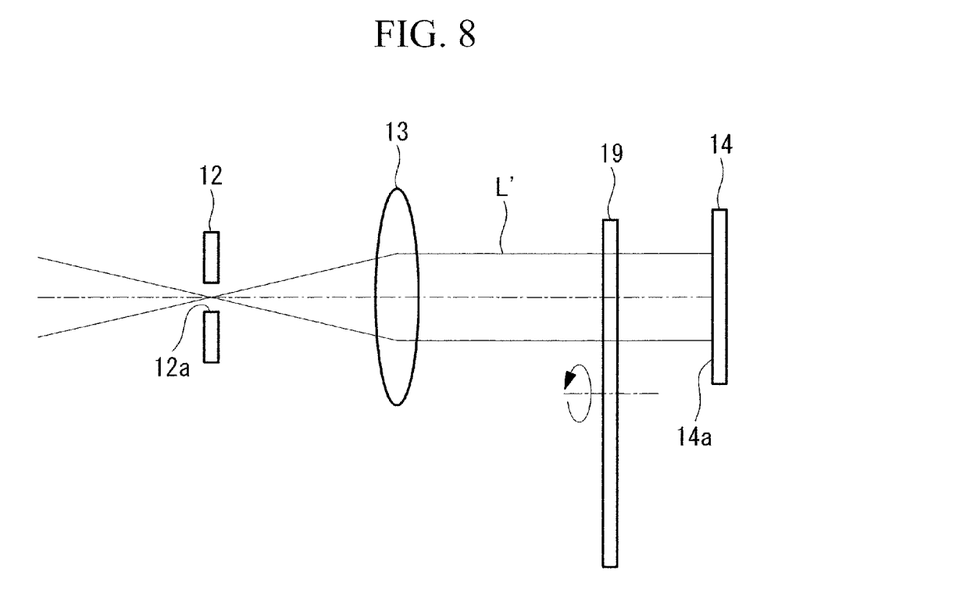
FIG. 8 is a partially-enlarged view showing a second modification of the laser microscope apparatus shown in FIG. 1.
Figure 9:
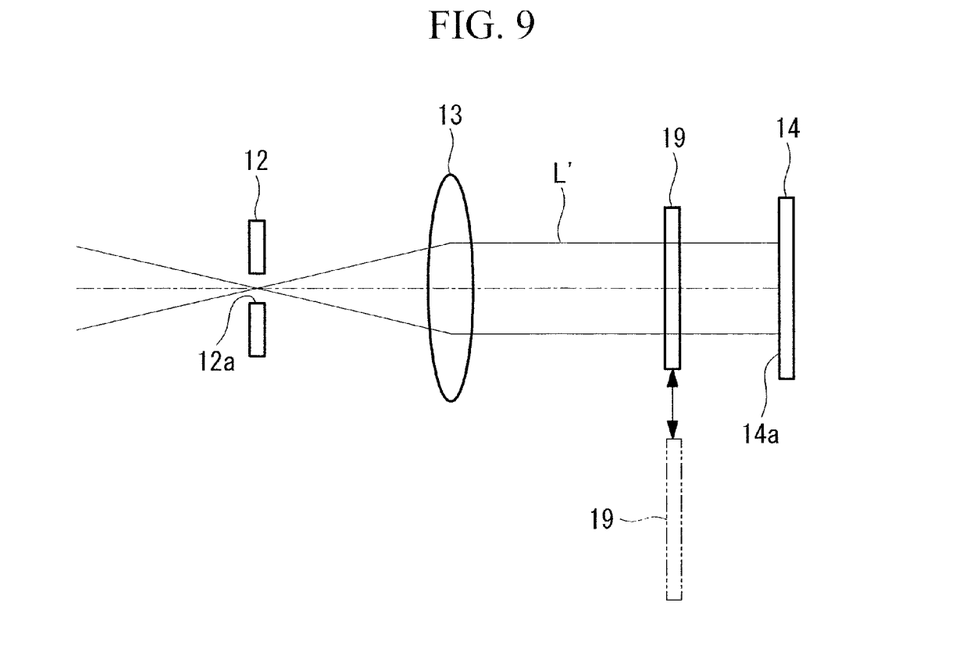
FIG. 9 is a view showing a partial configuration showing another example of the second modification of the laser microscope apparatus shown in FIG. 1.

As shown in FIGS. 8 and 9, a second-example incident-light-amount reducing unit is provided with an ND (neutral density) filter 19 that is disposed in the light path (detection light path) of the observation light L' from the objective lens 8 to the PPD 14, and the observation light L' whose intensity is reduced by the ND filter 19 is incident on the PPD 14. As shown in FIG. 8, the ND filter 19 may be a variable ND filter that is provided so as to be capable of rotating about an axis of rotation parallel to the optical axis of the laser light L and in which the transmission rate of the observation light L' (the reduced amount of observation light L') varies according to the angle of rotation thereof. Alternatively, as shown in FIG. 9, the ND filter 19 may be a fixed ND filter that is provided so as to be removably inserted in the detection light path and that has a constant transmission rate.

Figure 10:
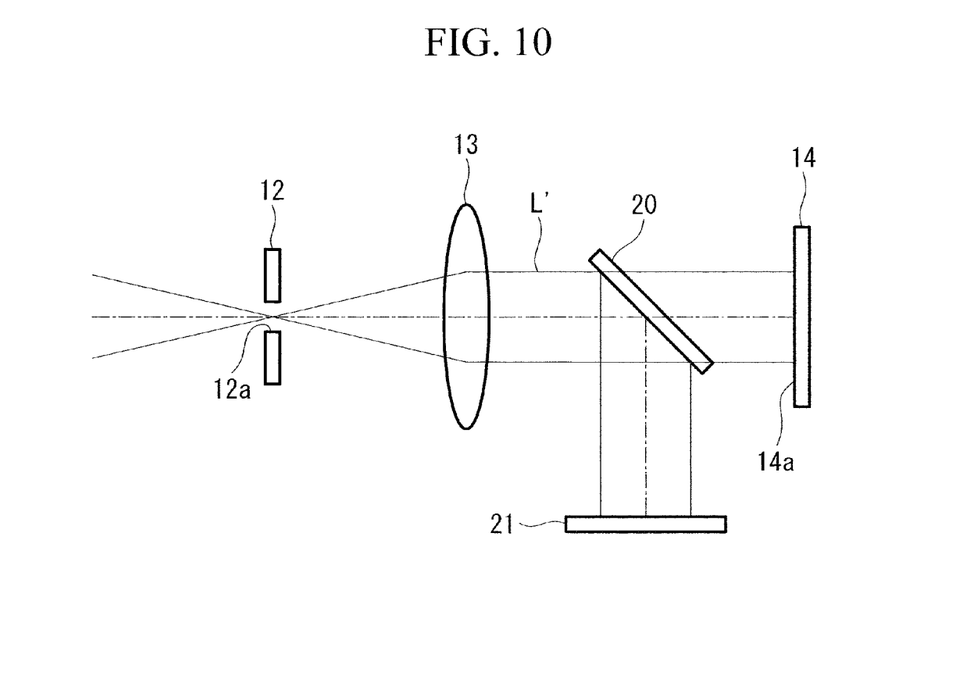
FIG. 10 is a partially-enlarged view showing a third modification of the laser microscope apparatus shown in FIG. 1.
Figure 11:
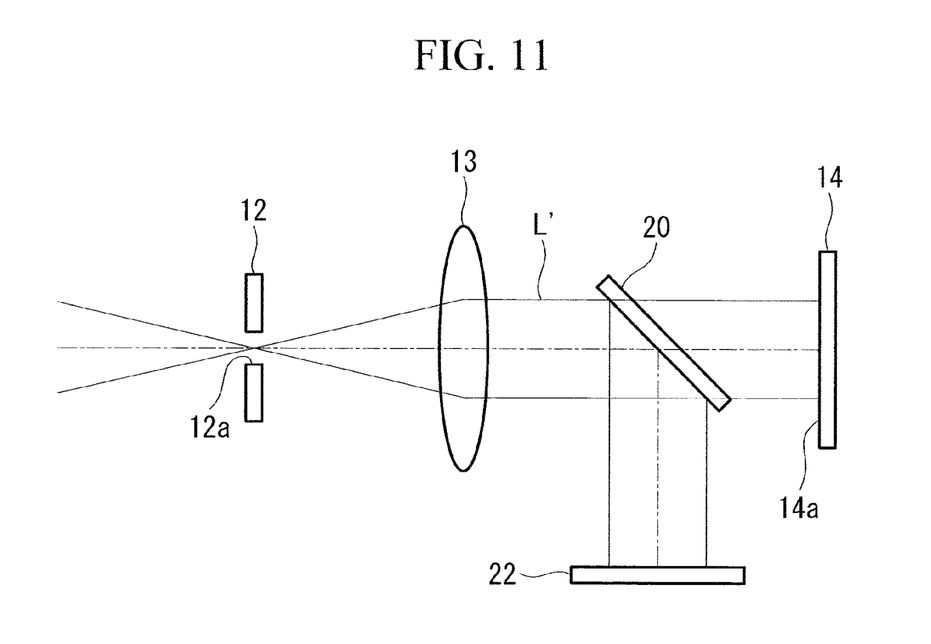
FIG. 11 is a partially-enlarged view showing another example of the third modification of the laser microscope apparatus shown in FIG. 1.

As shown in FIGS. 10 and 11, a third-example incident-light-amount reducing unit is provided with a partially-reflecting mirror 20 that is provided so as to be removably inserted in the light path (detection light path) of the observation light L from the objective lens 8 to the PPD 14, that allows only part of the observation light L' to be transmitted therethrough, and that reflects the other part thereof. As shown in FIG. 10, the observation light L' reflected by the partially-reflecting mirror 20 is absorbed by a beam damper 21.

Instead of the beam damper 21, another PPD (sub photo-detection unit) 22 that detects the reflected observation light L' may be provided, as shown in FIG. 11. When the POD 22 is provided, the observation light L' may be simultaneously detected by the two PODs 14 and 22, and signals obtained by averaging intensity signals output from the PPD 14 and intensity signals output from the PPD 22 may be used as image gradation values. By doing so, it is possible to improve the signal-to-noise ratio of the image.

A plurality of the above-described first- to third-example incident-light-amount reducing units can be combined and adopted. When a plurality of types of the incident-light-amount reducing units are provided, the user may be able to select the incident-light-amount reducing unit to be used.

Fourth Modification

In a fourth modification of the above-described embodiments, the PPD 14 may have two types of operation modes, i.e., a Geiger mode and a linear mode.

The Geiger mode is a mode in which the PPD 14 is operated with the voltage applied to the PPD 14 set to a breakdown voltage or higher. In the Geiger mode, the PPD 14 multiplies observation light L' incident on each pixel by an extremely-high multiplication factor, and thus weak observation light L' can be detected with an extremely-high sensitivity. In the Geiger mode, the PPD 14 has a dead time during which, even when a photon is incident on a pixel, the photon cannot be detected.

On the other hand, the linear mode is a mode in which the PPD 14 is operated with the voltage applied to the PPD 14 set lower than the breakdown voltage. In the linear mode, although the multiplication factor used by the PPD 14 for the observation light L' is lower than that in the Geiger mode, the intensity of an intensity signal is proportional to the amount of observation light L' incident on the PPD 14.

In this modification, a multiplication-factor reduction permitting unit (not shown) is further provided, which permits switching from the Geiger mode to the linear mode when the number of saturated picture elements is equal to or more than the predetermined number N. The multiplication-factor reduction permitting unit is, for example, a GUI provided in the computer 3.

According to this modification, the Geiger mode is usually used, and, when entering a saturated state, the Geiger mode is switched to the linear mode, in which the multiplication factor for the observation light L' is smaller, thus expanding the dynamic range of the PPD 14 and allowing observation light L with a strong intensity to be accurately detected.

The following invention is derived from the above-described embodiments and modifications.

The present invention provides a laser microscope apparatus including: a scanning unit that scans laser light on a sample; an objective lens that collects observation light produced in the sample when irradiated with the laser light; a photo-detection unit that has a light-receiving surface formed by arraying a plurality of detecting elements capable of detecting a single photon on a planar surface, that receives the observation light collected by the objective lens and incident, on the light-receiving surface, and that outputs intensity signals having intensities corresponding to the amounts of the received observation light; an image generating unit that generates an image of the sample on the basis of the intensities of the intensity signals output from the photo-detection unit and scanning positions of the laser light scanned by the scanning unit; and a processor for notifying, when the intensity signals used to generate the image in the image generating unit include intensity signals having intensities equal to or larger than a predetermined threshold, a user of the existence of the intensity signals having intensities equal to or larger than the predetermined threshold, in which the predetermined threshold is set according to a beam diameter of the observation light incident on the light-receiving surface.

According to the present invention, observation light produced in a sample when the scanning unit scans laser light on the sample is collected by the objective lens and is detected by the photo-detection unit, and an intensity signal corresponding to the intensity of the observation light is output from the photo-detection unit. Intensity signals output from the photo-detection unit are associated with scanning positions on the sample scanned with laser light by the scanning unit, thereby generating an image.

It this case, in the photo-detection unit, a plurality of detecting elements that detect light at single-photon level are used, thereby detecting the intensity of the entire observation light. The saturation level of such a photo-detection unit (the maximum intensity of light that can be detected by the photo-detection unit) is determined for each observation condition and depends on the incident-beam diameter of observation light incident on the light-receiving surface. On the other hand, although the predetermined threshold, which corresponds to the saturation level, is set according to the incident-beam diameter, when the saturation level of the photo-detection unit varies, the predetermined threshold varies in conjunction with the saturation level. When there exist, in an image, intensity signals corresponding to the saturation level, the processor operates to notify the user of that fact. In this way, the predetermined threshold, which varies in conjunction with the saturation level of the photo-detection unit, is used as a criterion for the notifying operation of the processor, thereby making it possible for the user to easily determine the saturation level of the photo-detection unit, which varies with a change in observation condition, on the basis of the notifying operation of the processor.

In the above-described invention, the predetermined threshold may be set on the basis of an exit NA of the objective lens.

The beam diameter of observation light incident on the light-receiving surface depends on the exit NA of the objective lens. Therefore, the saturation level of the photo-detection unit can be calculated by using the exit NA of the objective lens.

In the above-described invention, it is possible to further include a pinhole member that is provided between the objective lens and the photo-detection unit and that has a pinhole located at a position optically conjugate with a focal point of the objective lens, in which the predetermined threshold may be set on the basis of an aperture size of the pinhole.

In the configuration of the confocal microscope in which observation light that has passed through the pinhole is detected by the photo-detection unit, the beam diameter of observation light incident on the light-receiving surface depends on the aperture size of the pinhole. Therefore, the saturation level of the photo-detection unit can be calculated by using the aperture size of the pinhole.

In the above-described invention, it is possible to further include: a diffraction grating that is provided between the objective lens and the photo-detection unit and that separates the observation light collected by the objective lens by wavelength to generate spectral sequences; and a slit member having a slit that has a width dimension in the direction in which the spectral sequences generated by the diffraction grating are arrayed and that allows only part of the spectral sequences to pass therethrough, in which the predetermined threshold may be set on the basis of the width dimension of the slit.

In the configuration in which observation light is dispersed by the diffraction grating, and only light of some wavelengths that have passed through the slit is detected, the beam diameter of observation light incident on the light-receiving surface depends on the width dimension of the slit. Therefore, the saturation level of the photo-detection unit can be calculated by using the width dimension of the slit.

In the above-described invention, it is possible to further include: a condition setting unit that sets an observation condition for the sample; and a threshold setting unit that stores a table in which the observation condition for the sample is associated with the predetermined threshold and that sets the predetermined threshold to be used by the processor on the basis of the observation condition set by the condition setting unit and the table. Alternatively, in the above-described invention, it is possible to further include: a condition setting unit that sets an observation condition for the sample; and a threshold setting unit that stores a function in which the observation condition for the sample is associated with the predetermined threshold and that calculates the predetermined threshold from the function on the basis of the observation condition set by the condition setting unit.

By doing so, a predetermined threshold optimized for the observation condition can be automatically set.

In the above-described invention, it is possible to further include an amplifying unit that is provided between the photo-detection unit and the image generating unit and that amplifies the intensity signals output from the photo-detection unit, in which the predetermined threshold may be set according to an amplification factor for the intensity signals, the amplification factor being used in the amplifying unit.

By doing so, it is possible to facilitate comparison between the intensity signals, which are amplified by the amplifying unit and used for image generation at the image generating unit, and the predetermined threshold.

In the above-described invention, the predetermined threshold may be set according to the maximum value in a range within which the intensities of the intensity signals output from the photo-detection unit can fall, the maximum value being determined on the basis of the beam diameter of the observation light incident on the light-receiving surface.

By doing so, the predetermined threshold can be set to a value corresponding to the saturation level of the photo-detection unit. Because the saturation level of the photo-detection unit varies according to the scanning speed of laser light scanned by the scanning unit, the predetermined threshold may be set according to the scanning speed of the laser light scanned by the scanning unit.

In the above-described invention, there may be further provided a notification unit that outputs at least one of a warning indication, a warning light, and a warning sound, and the processor may be configured to cause the notification unit to output at least one of the warning indication, the warning light, and the warning sound.

By doing so, the existence of saturated picture elements at which the intensities of the intensity signals are equal to or larger than the predetermined threshold can be reliably recognized by the user in a visual or auditory manner.

In the above-described invention, the processor may be configured to highlight picture elements at which the intensities of the intensity signals are equal to or larger than the predetermined threshold, against the other picture elements in the image generated by the image generating unit.

By doing so, when there exist saturated picture elements in an image, the saturated picture elements are highlighted in the image; therefore, the user can easily recognize the existence of saturated picture elements from the image being observed.

In the above-described invention, the processor may be configure to change a gradation of the image generated by the image generating unit such that the intensities of the intensity signals that are equal to the predetermined threshold correspond to the maximum value in a range of gradation values that each picture element of the image can have.

By doing so, when there exist saturated picture elements, the saturated picture elements are displayed at the maximum gradation value in the image; therefore, the user can easily recognize the existence of saturated picture elements from the image being observed. Furthermore, because a change in brightness of the saturated picture elements in the image caused by a change in predetermined threshold is suppressed, the user can observe the image without needlessly worrying about the change in the predetermined threshold.

In the above-described invention, it is possible to further include an amplifying unit that is provided between the photo-detection unit and the image generating unit and that amplifies the intensity signals, in which the processor may be configure to adjust, when the intensities of the intensity signals are equal to or larger than the predetermined threshold, an amplification factor for the intensity signals, the amplification factor being used in the amplifying unit, such that the intensities of the intensity signals that are equal to the predetermined threshold correspond to the maximum value in a range of gradation values that each picture element of the image can have.

By doing so, when there exist saturated picture elements, the saturated picture elements are displayed at the maximum gradation value in the image; therefore, the user can easily recognize the existence of saturated picture elements from the image being observed. Furthermore, because a change in brightness of the saturated picture elements in the image caused by a change in predetermined threshold is suppressed, the user can observe the image without needlessly worrying about the change in the predetermined threshold.

In the above-described invention, it is possible to further include: an incident-light-amount reducing unit that reduces the amount of the observation light incident on the photo-detection unit; and an incident-light-amount reduction permitting unit that permits operation of the incident-light-amount reducing unit when the intensities of the intensity signals are equal to or larger than the predetermined threshold.

By doing so, when the photo-detection unit is in the saturated state with respect to the observation light, the incident-light-amount reducing unit is operated to reduce the amount of observation light incident on the photo-detection unit, thereby making it possible to accurately detect the intensity of strong observation light.

In the above-described invention, the incident-light-amount reducing unit may attenuate the laser light to be radiated onto the sample.

By doing so, the observation light produced from the sample is attenuated by attenuating laser light radiated onto the sample, thereby making it possible to reduce the amount of observation light incident on the photo-detection unit with a simple configuration.

In the above-described invention, the incident-light-amount reducing unit may be provided with an ND filter that is provided so as to be removably inserted in a light path between the objective lens and the photo-detection unit or that is provided in the light path so as to be able to change the reduced amount of the observation light.

Alternatively, in the above-described invention, the incident-light-amount reducing unit may be provided with a partially-reflecting mirror that is provided so as to be removably inserted in a light path between the objective lens and the photo-detection unit, that allows only part of the observation light to pass therethrough, and that reflects the other part thereof.

By doing so, it is possible to reduce the amount of observation light incident onto the photo-detection unit with a simple configuration and control, in which the ND filter or the partially-reflecting mirror is merely inserted in the light path or in which the reduced amount of laser light is merely changed with the ND filter.

In the above-described invention, it is possible to further include a beam damper that absorbs the observation light reflected by the partially-reflecting mirror.

In the above-described invention, it is possible to further include a sub photo-detection unit that detects the observation light reflected by the partially-reflecting mirror, in which the photo-detection unit and the sub photo-detection unit may detect the observation light at the same time; and the image generating unit may generate the image on the basis of signals obtained by averaging intensity signals output from the photo-detection unit and intensity signals output from the sub photo-detection unit.

By doing so, it is possible to improve the signal-to-noise ratio of the image.

In the above-described invention, the photo-detection unit may have a multiplication function for multiplying the observation light incident on the detecting elements; and the laser microscope apparatus may further include a multiplication-factor reduction permitting unit that permits reduction of a multiplication factor for the observation light, the multiplication factor being used in the photo-detection unit, when the intensity signals having intensities equal to or larger than the predetermined threshold are included.

By doing so, the multiplication factor for observation light is reduced when the photo-detection unit is in the saturated state with respect to the observation light, thereby making it possible to make the sensitivity of the photo-detection unit appropriate for strong observation light.

In the above-described invention, the photo-detection unit may be operated alternatively in a linear mode in which the photo-detection unit is driven with a voltage lower than a predetermined breakdown voltage being supplied or in a Geiger mode in which the photo-detection unit is driven with a voltage equal to or higher than the predetermined breakdown voltage being supplied and in which the observation light incident on the detecting elements is amplified by a multiplication factor higher than that in the linear mode; and the multiplication-factor reduction permitting unit may permit switching from the Geiger mode to the linear mode when the intensity signals having intensities equal to or larger than the predetermined threshold are included.

By doing so, when the sensitivity of the photo-detection unit for observation light is in the saturated state, the operation mode is switched from a high-sensitivity Geiger mode, in which observation light is multiplied by a high multiplication factor, to a low-sensitivity linear mode, in which observation light is multiplied by a low magnification, thereby making it possible to make the sensitivity of the photo-detection unit appropriate for strong observation light.

REFERENCE SIGNS LIST 1 laser microscope apparatus
3 computer (processor)
6 XY galvanometer mirror (scanning unit)
8 objective lens
12 confocal aperture (pinhole member)
12a pinhole
14 PPD (photo-detection unit)
14a light-receiving surface
16 amplifier (amplifying unit)
17 AD converter (amplifying unit, signal converting unit)
181 diffraction grating
184 slit member
184a slit
19 ND filter (incident-light-amount reducing unit)
20 partially-reflecting mirror (incident-light-amount reducing unit)
21 beam damper
22 PPD (sub photo-detection unit)
31 drive control software (condition setting unit, threshold setting unit)
32 image generation software
33 display unit
S sample
L laser light
L' observation light
L" spectral sequences

The invention claimed is:
1. A laser microscope apparatus comprising:
a scanner that scans laser light on a sample;
an objective lens that collects observation light produced in the sample when irradiated with the laser light;
a photodetector that has a light-receiving surface formed by arraying a plurality of detecting elements capable of detecting a single photon on a planar surface, that receives the observation light collected by the objective lens and incident on the light-receiving surface, and that composes detection signals of the plurality of detecting elements into intensity signals having intensities corresponding to the amounts of the received observation light and outputs the intensity signals; and
a processor configured to perform processes comprising:
an image generating process that generates an image of the sample based on the intensities of the intensity signals output from the photodetector and scanning positions of the laser light scanned by the scanner; and
a notifying process that, when the intensity signals used to generate the image in the image generating process include intensity signals having intensities equal to or larger than a predetermined threshold, outputs a notification to a user of the existence of the intensity signals having intensities equal to or larger than the predetermined threshold,
wherein the predetermined threshold is set according to a beam diameter of the observation light incident on the light-receiving surface.

2. The laser microscope apparatus according to claim 1, wherein the predetermined threshold is set based on an exit numerical aperture of the objective lens.

3. The laser microscope apparatus according to claim 1, further comprising a pinhole member that is provided between the objective lens and the photodetector and that has a pinhole located at a position optically conjugate with a focal point of the objective lens,
wherein the predetermined threshold is set based on an aperture size of the pinhole.

4. The laser microscope apparatus according to claim 1, further comprising:
a diffraction grating that is provided between the objective lens and the photodetector and that separates the observation light collected by the objective lens by wavelength to generate spectral sequences; and
a slit member having a slit that has a width dimension in the direction in which the spectral sequences generated by the diffraction grating are arrayed and that allows only part of the spectral sequences to pass therethrough,
wherein the predetermined threshold is set based on the width dimension of the slit.

5. The laser microscope apparatus according to claim 1, wherein the processor is further configured to perform processes comprising:
a condition setting process that sets an observation condition for the sample; and
a threshold setting process that sets the predetermined threshold based on the observation condition set in the condition setting process and data stored in a table in which each of observation conditions for the sample is associated with a respective predetermined threshold.

6. The laser microscope apparatus according to claim 1, wherein the processor is further configured to perform processes comprising:
a condition setting process that sets an observation condition for the sample; and
a threshold setting process that calculates the predetermined threshold from a stored function based on the observation condition set in the condition setting process.

7. The laser microscope apparatus according to claim 1, further comprising an amplifier that amplifies the intensity signals output from the photodetector before the image generating process is performed,
wherein the predetermined threshold is set according to an amplification factor for the intensity signals, the amplification factor being used in the amplifier.

8. The laser microscope apparatus according to claim 1, wherein the predetermined threshold is set according to the maximum value in a range within which the intensities of the intensity signals output from the photodetector can fall, the maximum value being determined based on the beam diameter of the observation light incident on the light-receiving surface.

9. The laser microscope apparatus according to claim 8, wherein the predetermined threshold is set according to a scanning speed of the laser light scanned by the scanner.

10. The laser microscope apparatus according to claim 1, wherein the notifying process outputs, as the notification, at least one of a warning indication, a warning light, and a warning sound.

11. The laser microscope apparatus according to claim 1, wherein the processor is further configured to highlight picture elements at which the intensities of the intensity signals are equal to or larger than the predetermined threshold, against the other picture elements in the image generated in the image generating process.

12. The laser microscope apparatus according to claim 1, wherein the processor is further configured to change a gradation of the image generated in the image generating process such that the intensities of the intensity signals that are equal to the predetermined threshold correspond to the maximum value in a range of gradation values that each picture element of the image can have.

13. The laser microscope apparatus according to claim 1, further comprising an amplifier that amplifies the intensity signals output from the photodetector before the image generating process is performed,
wherein the processor is further configured to adjust an amplification factor for the intensity signals, the amplification factor being used in the amplifier, such that the intensities of the intensity signals that are equal to the predetermined threshold correspond to the maximum value in a range of gradation values that each picture element of the image can have.

14. The laser microscope apparatus according to claim 1, further comprising:
an incident-light-amount reducing device that reduces the amount of the observation light incident on the photodetector,
wherein the processor is further configured to perform an incident-light-amount reduction permitting process that permits operation of the incident-light-amount reducing unit when the intensities of the intensity signals are equal to or larger than the predetermined threshold.

15. The laser microscope apparatus according to claim 14, wherein the incident-light-amount reducing device attenuates the laser light to be radiated onto the sample.

16. The laser microscope apparatus according to claim 14, wherein the incident-light-amount reducing device comprises a neutral density filter that is provided so as to be removably insertable into a light path between the objective lens and the photodetector or that is provided in the light path so as to be able to change the reduced amount of the observation light.

17. The laser microscope apparatus according to claim 14, wherein the incident-light-amount reducing device comprises a partially-reflecting mirror that is provided so as to be removably insertable into a light path between the objective lens and the photodetector, that allows only part of the observation light to pass therethrough, and that reflects the other part thereof.

18. The laser microscope apparatus according to claim 17, further comprising a beam damper that absorbs the observation light reflected by the partially-reflecting mirror.

19. The laser microscope apparatus according to claim 17, further comprising a sub photodetector that detects the observation light reflected by the partially-reflecting mirror,
wherein the photodetector and the sub photodetector detect the observation light at the same time, and
wherein the image generating process generates the image based on signals obtained by averaging intensity signals output from the photodetector and intensity signals output from the sub photodetector.

20. The laser microscope apparatus according to claim 1, wherein the photodetector has a multiplication function for multiplying the observation light incident on the detecting elements, and
wherein the processor is further configured to perform a multiplication-factor reduction permitting process that permits reduction of a multiplication factor for the observation light, the multiplication factor being used in the photodetector, when the intensity signals having intensities equal to or larger than the predetermined threshold are included.

21. The laser microscope apparatus according to claim 20, wherein the photodetector is operable alternatively in a linear mode in which the photodetector is driven with a voltage lower than a predetermined breakdown voltage being supplied or in a Geiger mode in which the photodetector is driven with a voltage equal to or higher than the predetermined breakdown voltage being supplied and in which the observation light incident on the detecting elements is amplified by a multiplication factor higher than that in the linear mode, and
wherein the multiplication-factor reduction permitting process permits switching from the Geiger mode to the linear mode when the intensity signals having intensities equal to or larger than the predetermined threshold are included.

22. The laser microscope apparatus according to claim 1, wherein the photodetector is a pixelated photon detector.

* * * * *